Dec. 7, 1943.  P. W. BROWN  2,335,995
CARVING FIXTURE
Filed Jan. 31, 1941  6 Sheets-Sheet 1

INVENTOR
PERRY W. BROWN.
BY
ATTORNEY

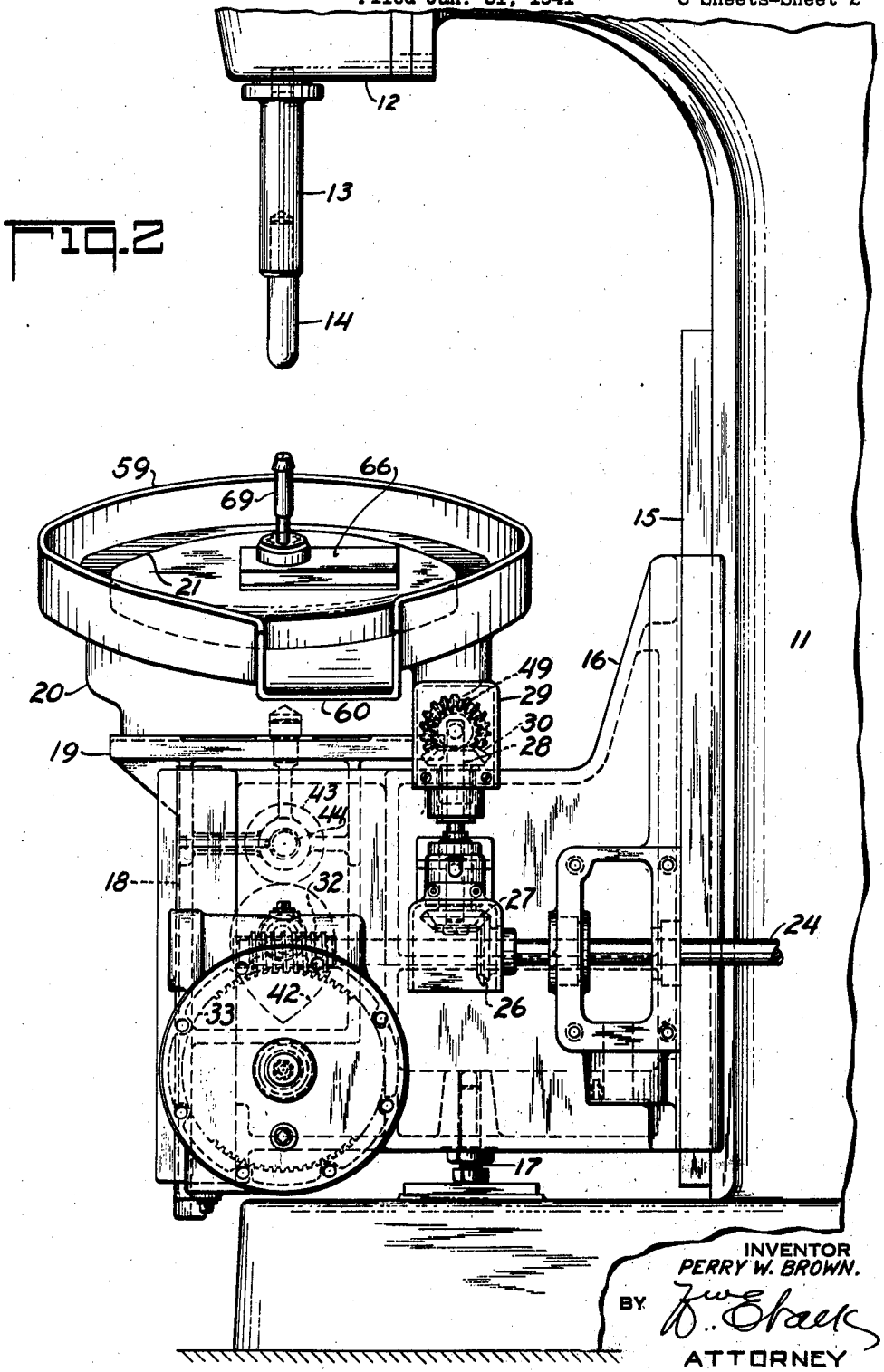

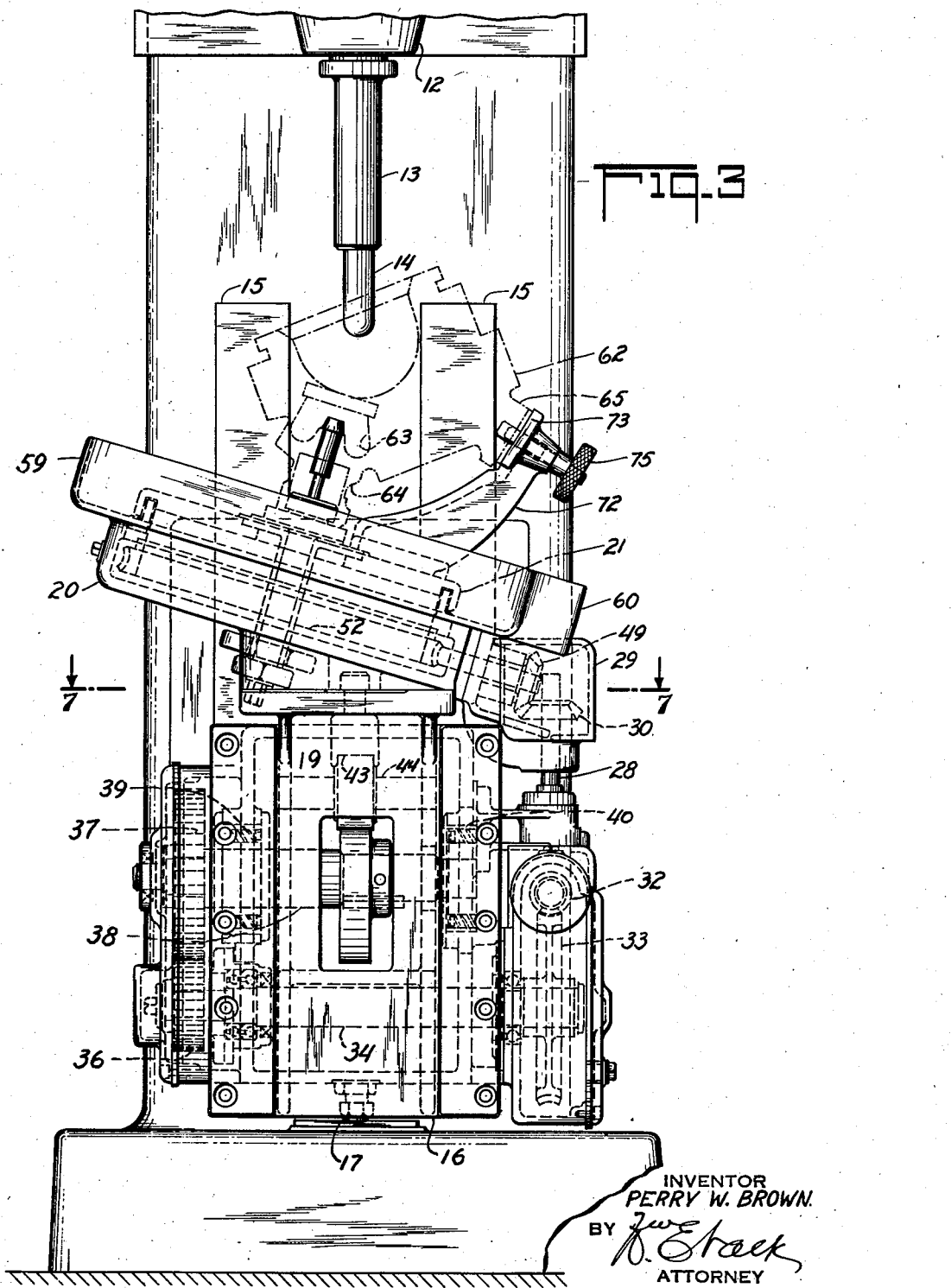

Dec. 7, 1943.     P. W. BROWN     2,335,995
CARVING FIXTURE
Filed Jan. 31, 1941     6 Sheets-Sheet 4
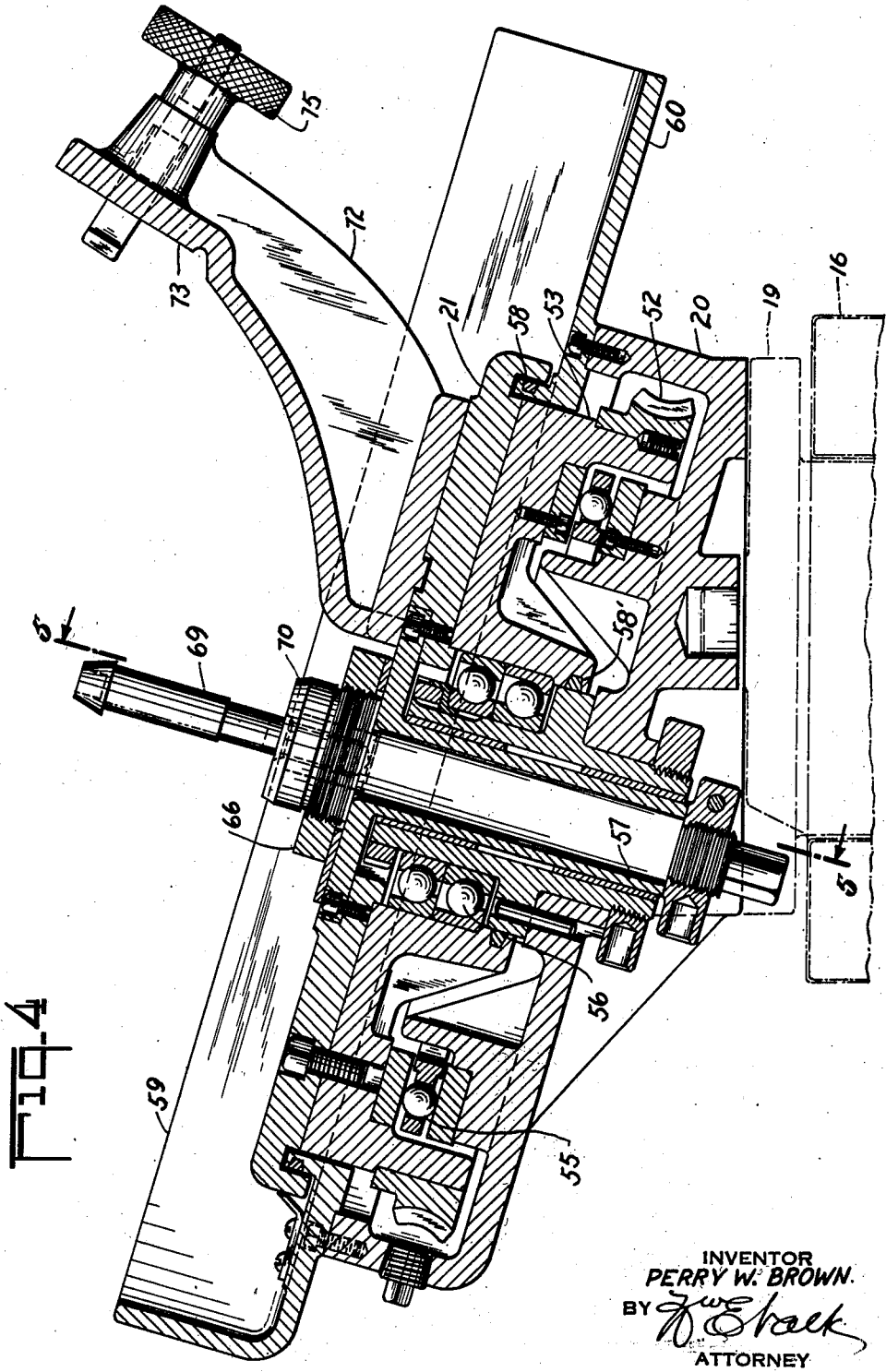
INVENTOR
PERRY W. BROWN
BY 
ATTORNEY

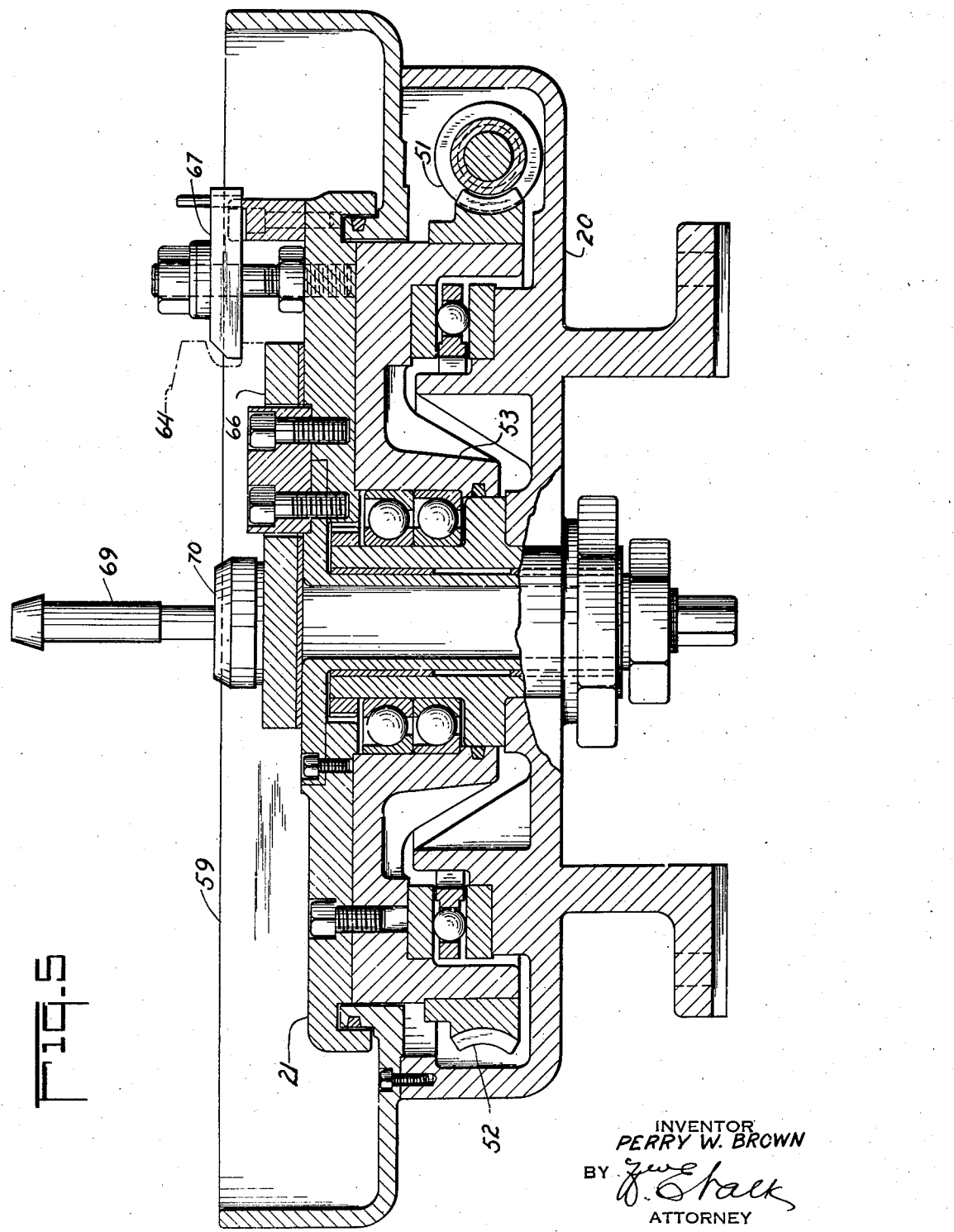

Patented Dec. 7, 1943

2,335,995

UNITED STATES PATENT OFFICE 2,335,995

CARVING FIXTURE

Perry W. Brown, Ridgewood, N. J., assignor to Wright Aeronautical Corporation, a corporation of New York Application January 31, 1941, Serial No. 376,778

1 Claim. (Cl. 90—20)

This invention relates to machine tools and more particularly to feed fixtures for milling or carving machines.

An object of the invention is to provide a movable work holding fixture cooperating with a rotating cutter by which axially waved annular surfaces or grooves may be formed.

A further object is to provide tool equipment for cutting deep grooves whose depth varies according to a prearranged profile throughout the length of the groove.

A further object is to provide tool equipment for formed grooves curved in plan form and of changing depth wherein the side surfaces of the groove are sloped with respect to a datum axis.

Further objects of the invention will become apparent in reading the annexed detailed description in connection with the drawings, in which:

Fig. 2 is a fragmentary side elevation showing the drive mechanism for the fixture;

Fig. 3 is a fragmentary front elevation of the milling machine and fixture;

Fig. 4 is a section across the work table of the fixture comprising a section on the line 4—4 of Fig. 6;

Fig. 5 is a section on the line 5—5 of Fig. 4;

Although the provisions of the invention are shown as applied to a vertical milling machine, the teachings may be used in connection with other types of machine tools. In particular, the mechanism of the invention is adapted for the formation of valve ports in the cylinder heads of internal combustion engine cylinders for aircraft. Such cylinder heads have in the past been formed from castings whereas it is now contemplated to form them from forgings of non-ferrous materials such as copper or aluminum alloys, by which better mechanical properties of the forgings may be utilized in high performance engines, since the cylinder head castings previously used have limitations in their mechanical properties diminishing their utility as the power output of aeronautical engines is increased. Many of the machining operations for cylinder head forgings may be accomplished by relatively simple turning, boring, or milling operations but the profiling of the valve ports is a machining operation of complicated character which is not readily accomplished by conventional machining operations. Thus, the fixture of this invention was developed by which the profiling of the valve ports may be accomplished in a single feeding operation, the valve ports comprising in general a deep annular groove whose depth varies throughout its circumference. A further peculiarity of the valve port profile is that the sides of the groove forming the port comprise conical elements which are not parallel either with the valve axis or with any other axis or plane of the cylinder head structure.

As will shortly be apparent, the provisions of this invention enable this odd-shaped valve port to be formed with great facility and although particularly adapted for forming valve ports, the fixture of the invention may be readily adapted for forming or carving odd-shaped elements in machine parts other than engine cylinder heads.

Figure 1:
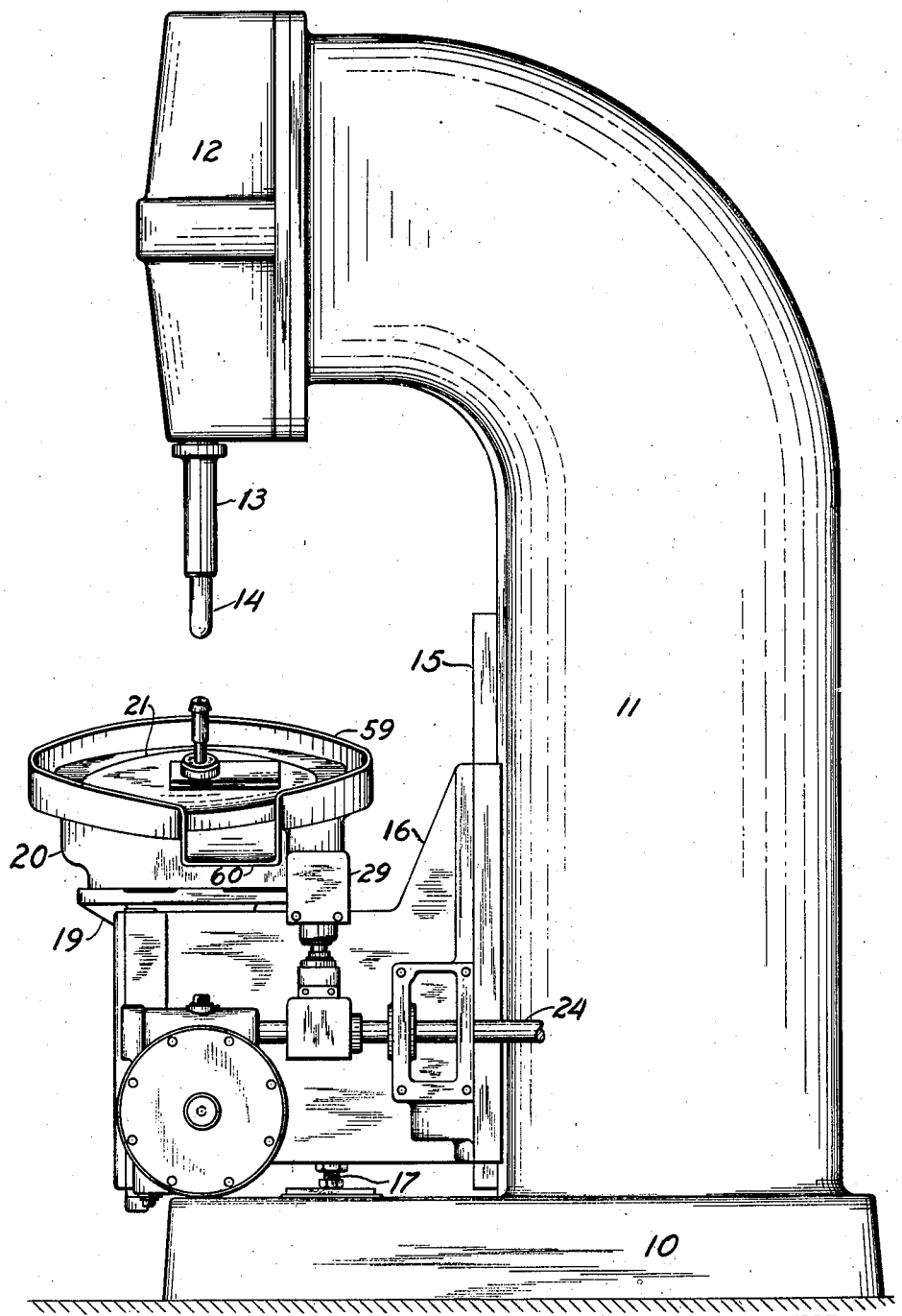
Fig. 1 is a side elevation of a vertical milling machine equipped with a fixture of the invention.

Referring now to the drawings, Figs. 1, 2 and 3 show a more or less standard vertical milling machine comprising a base 10, a standard 11, and a head 12 from which depends a vertical cutter spindle 13 carrying a cutter 14 which for the purpose of profiling valve ports is an end mill with a hemispherical end. The spindle 13 is adapted to be rotatably driven by gearing and other apparatus, not shown, forming a normal part of a vertical milling machine.

The standard 11 is provided with vertical ways 15 supporting a knee 16, the knee being shiftable vertically upon the ways 15 by a suitable power feed, not shown, or by a screw jack 17 between the base 10 and the knee 16.

Figure 7:
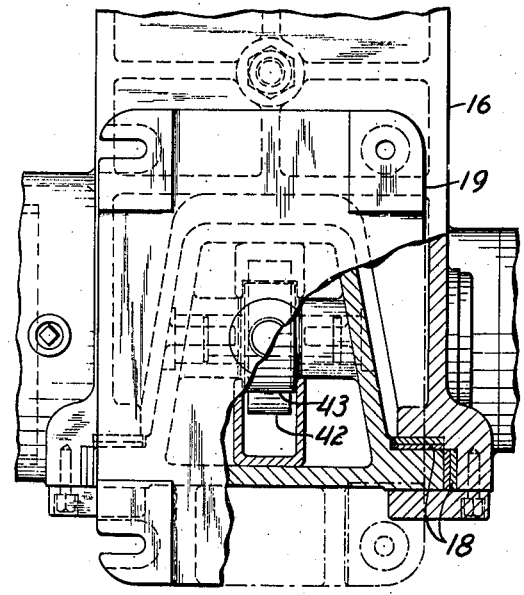
Fig. 7 is a section on the line 7—7 of Fig. 3.

As will be apparent from Figs. 2, 3, and 7, the knee 16 comprises a bed carrying drive gearing and ways 18 in which a support 19 is mounted for vertical reciprocation. Upon the top of the support 19 is mounted an element 20, reciprocable with the support 19, upon which a work table 21 is mounted for rotation on an axis which is tilted with respect to the axis of the spindle 13.

A feed power shaft 24 is journalled in the knee 16 on a side thereof and is driven by a suitable power source, not shown, this power shaft carrying a bevel gear 26 meshed with a bevel gear 27 on a vertical axis whose shaft 28 is journalled in the knee and in a gear box 29 carried by the member 20, the journals of the gear box 29, along with a bevel gear 30 mounted on the shaft 28, being vertically slidable along the shaft 28 as the member 20 reciprocates in a vertical direction.

The power shaft 24 also carries a worm 32 driving a worm wheel 33 secured to a shaft 34 journalled in and extending across the lower end of the knee 16, the opposite end of the shaft 34 mounting a pinion 36 meshed with a gear 37 mounted on a shaft 38 journalled in the knee as at 39 and 40. Centrally of the shaft 38 is a cam 42 upon which rests a roller 43 idling on a shaft 44 journalled in the support 19. It is apparent that there is a substantial speed reduction from the power shaft 24 to the cam 42 so that, as the power shaft 24 rotates, the support 19 will slowly move up and down, following the profile of the cam 42 which cam may readily be replaced as different degrees of support rise are desired or as changes are required in the type of vertical reciprocative motion of the support 19.

Figure 6:
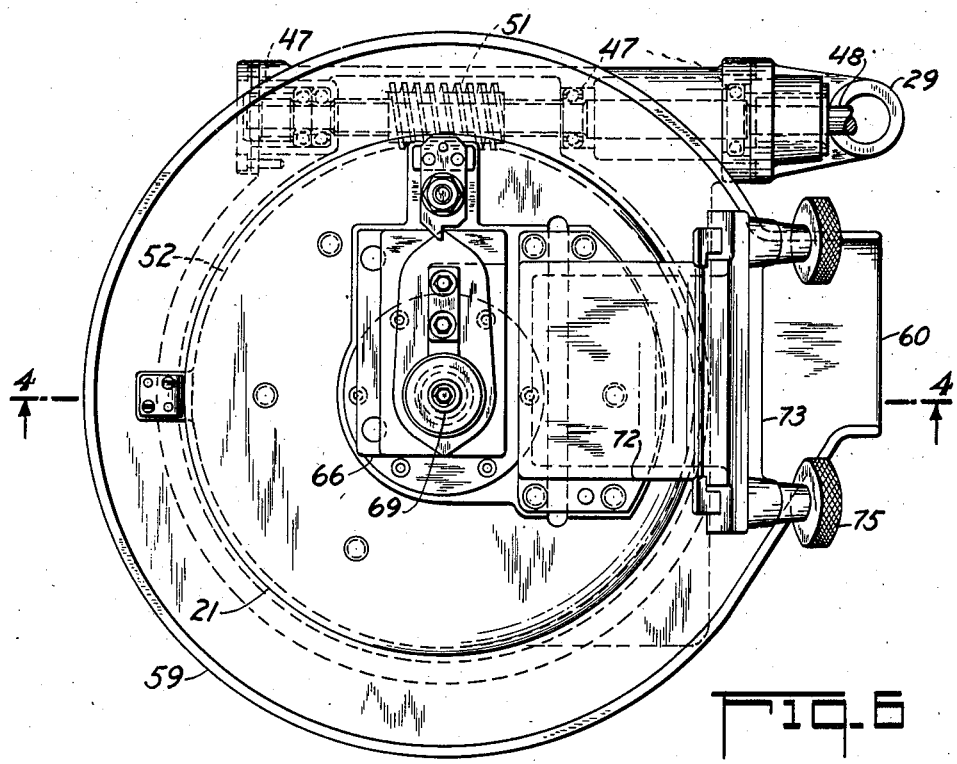
Fig. 6 is a plan of the work table.

The member 20, on which the work table 21 is journalled on its tilted axis, as shown in Figs. 4, 5 and 6, is provided with bearings 47 carrying a shaft 48 to which a bevel gear 49 is secured for engagement with the bevel gear 30, said shaft 48 carrying a worm 51 engaged with a worm wheel 52 secured to a plate 53 which forms a mounting for the work table 21. Between the plate 53 and the member 20 is a thrust bearing 55 and a plurality of bearings 56 by which a spindle 57 for the table 21 is accurately held, said spindle being secured to the table 21. Oil seals 58 and 58' are provided in the table mounting system to retain lubricating oil in the member 20 for lubricating the several bearings and the worm and wheel drive. To the member 20, a pan or shield 59 is secured to catch that cutting oil or cutting compound fed to the work being operated upon, such fluid dripping from the pan 59 through the medium of an exit trough 60 disposed at the lower side of the pan.

Fig. 3 shows, in dot-dash lines, a cylinder head 62 in position for carving of its valve port 63, the cylinder head including rocker boxes 64 and 65 which are utilized as mounting elements in the machining process. The rocker box 64 is engaged with a pad 66 secured to the table 21 and is held by a clamp 67, the valve guide opening of the rocker box being located concentric with the axis of the table 21 by a locating plug 69 passed therethrough and into a bushing 70 engaged with the pad 66. A bracket 72 is secured to the table 21 and is provided with a pad 73 upon which the top face of the rocker box 65 rests, the pad 73 being provided with a clamping device 75 engaging a portion of the rocker box to secure it against displacement.

For the particular job of profiling valve ports, drive gearing for rotation of the work table 21 and for reciprocation of the support 19 will be so organized that the table 21 makes one complete revolution while the cam 42 makes one complete revolution. Thus, when the cylinder head blank 62 is set up on the table 21, and when the knee 16 is raised so that the cutter 14 engages the workpiece, the feed drive shaft 24 will be started so that as the work piece turns, it is gradually raised and lowered with respect to the cutter 14, thereby forming the valve port groove 63 as a substantially annular groove whose depth varies throughout its periphery. Obviously, the depth variation is obtained from an appropriate profile on the cam 42. The diameter of the groove 63 is established by the lateral position of the member 20 with respect to the axis of the cutter 14. The slope of the sides of the groove 63 with respect to the axis of the valve guide and thus with respect to the axis of the table 21 is established by the tilt of the axis of the table 21 with respect to the axis of the cutter 14. For any predetermined job on a cylinder head, the slope of the groove 63 will be established and the member 20 may be constructed accordingly, the bevel gears 30 and 49 for rotatably driving the table being chosen in accordance with such tilt. If a different degree of tilt is desired, the position of the member 20 and the relative angles of the gears 30 and 49 will be chosen accordingly.

It is apparent that the cam 42 may be varied in form and varied as to the number of lobes thereon to secure different forms of cut by the cutter 14. For instance, a two lobe cam would cause the valve port groove 63 to have two high points and two low points, instead of one high point and one low point as obtained through the use of the single lobe cam 42. The desired profile for the bottom of the groove 63 is secured merely by replacing the cam 42 by one appropriate to the new profile.

In the above description, the various mountings and bearings for the component parts have not been described in detail since it is considered that the appropriate choice of bearings and mountings will be apparent to one skilled in the art. The sliding connection between the gear 30, which is journalled in the gear box 29, and its drive shaft 28 may comprise a keyed arrangement or a splined arrangement as desired. In fact, some of the gearing shown in the drawings could be replaced by other forms of power transmission, so long as the feed relationship of the rotating table and the means for reciprocating the rotating table is maintained to secure the desired motion of the work piece mounted upon the work table.

It is also considered to be within the scope of the invention to use other sorts of carving cutters 14 than that depicted. In some classes of work, the provisions of the invention might be used in connection with horizontal rather than vertical milling machines or in machine tools where the cutter might be stationary rather than rotative.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In a milling machine for cutting an annular groove in a work piece, a rotatable end mill cutter, a rotatable work table adapted to carry a work piece into engagement with said cutter, means for rotating said table about an axis which is inclined to the axis of said cutter and disposed parallel to the axis of the annular groove to be cut, said cutter axis being so disposed that it is at all times parallel to that portion of the side walls of said groove in contact with said cutter, and means operative simultaneously and in timed relation to the rotation of said table for effecting relative reciprocation of said table and cutter along a path parallel to the axis of said cutter so that said machine is adapted to cut an annular groove of varying depth in said work piece with the side walls of said annular groove inclined to the axis of said groove.

PERRY W. BROWN.